United States Patent
Boscaratto et al.

(10) Patent No.: US 6,787,096 B2
(45) Date of Patent: Sep. 7, 2004

(54) DEVICE FOR TREATING PREFORMS TO OBTAIN CONTAINERS MADE OF PLASTICS

(75) Inventors: Alessandro Boscaratto, Conegliano (IT); Stefano Brun, Vittorio Veneto (IT)

(73) Assignee: Alkam S.r.l., Cordignano (IT)

( * ) Notice: Subject to any disclaimer, the term of this patent is extended or adjusted under 35 U.S.C. 154(b) by 160 days.

(21) Appl. No.: 10/101,153

(22) Filed: Mar. 20, 2002

(65) Prior Publication Data

US 2002/0142065 A1 Oct. 3, 2002

(30) Foreign Application Priority Data

Mar. 29, 2001 (SM) ................. SM-A-2001 00008

(51) Int. Cl.[7] .......................... B29C 31/08; B29C 49/68
(52) U.S. Cl. .................. 264/535; 198/468.3; 425/526; 425/534
(58) Field of Search ............... 264/535, 537; 425/526, 534; 198/468.3

(56) References Cited

U.S. PATENT DOCUMENTS

| | | | | |
|---|---|---|---|---|
| 4,197,073 A | * | 4/1980 | Rees et al. | 425/534 |
| 4,310,282 A | * | 1/1982 | Spurr et al. | 425/533 |
| 4,313,905 A | | 2/1982 | Hafele | 264/535 |
| 4,351,631 A | * | 9/1982 | Gessner et al. | 425/534 |
| 4,391,578 A | * | 7/1983 | Schaar | 425/534 |
| 4,470,797 A | * | 9/1984 | Harry et al. | 425/534 |
| 4,484,884 A | * | 11/1984 | Wiatt et al. | 425/534 |
| 4,694,951 A | * | 9/1987 | Gibbemeyer | 198/468.3 |
| 4,723,906 A | * | 2/1988 | Gibbemeyer | 425/534 |
| 4,797,084 A | * | 1/1989 | Nakamura et al. | 425/534 |
| 5,273,152 A | * | 12/1993 | Brun | 198/468.3 |
| 5,643,619 A | * | 7/1997 | Oas et al. | 425/534 |
| 5,863,571 A | | 1/1999 | Santais et al. | 425/534 |
| 5,902,612 A | * | 5/1999 | Ogihara | 425/526 |
| 6,156,258 A | * | 12/2000 | Takada et al. | 264/537 |

FOREIGN PATENT DOCUMENTS

WO   00 06356   2/2000

* cited by examiner

Primary Examiner—Robert B. Davis
(74) Attorney, Agent, or Firm—Guido Modiano; Albert Josif; Daniel O'Byrne

(57) ABSTRACT

A device for treating preforms to obtain containers made of plastics, for example bottles for food applications, comprising an ejector adapted to pick up and release one or more preforms, arranged so that their neck is directed upwardly, a heating conveyor, and a unit for transferring the preforms unloaded from the heating conveyor, which is adapted to modify their spacing and speed, adapting them to the spacing and speed of an adjacent and axially offset blow-molding conveyor to which the one or more preforms are transferred.

14 Claims, 6 Drawing Sheets

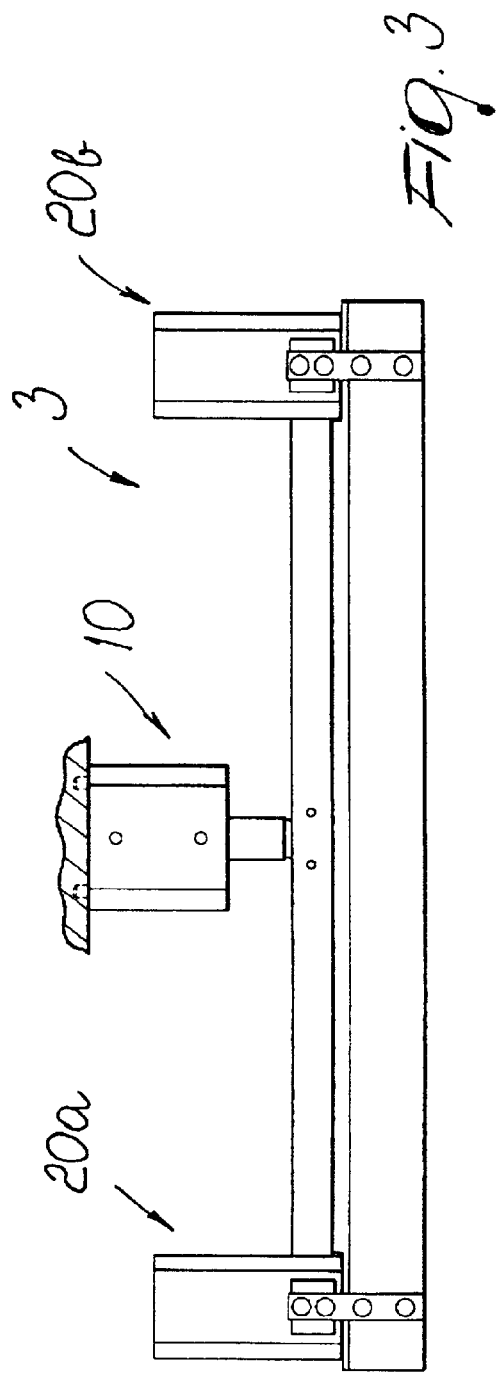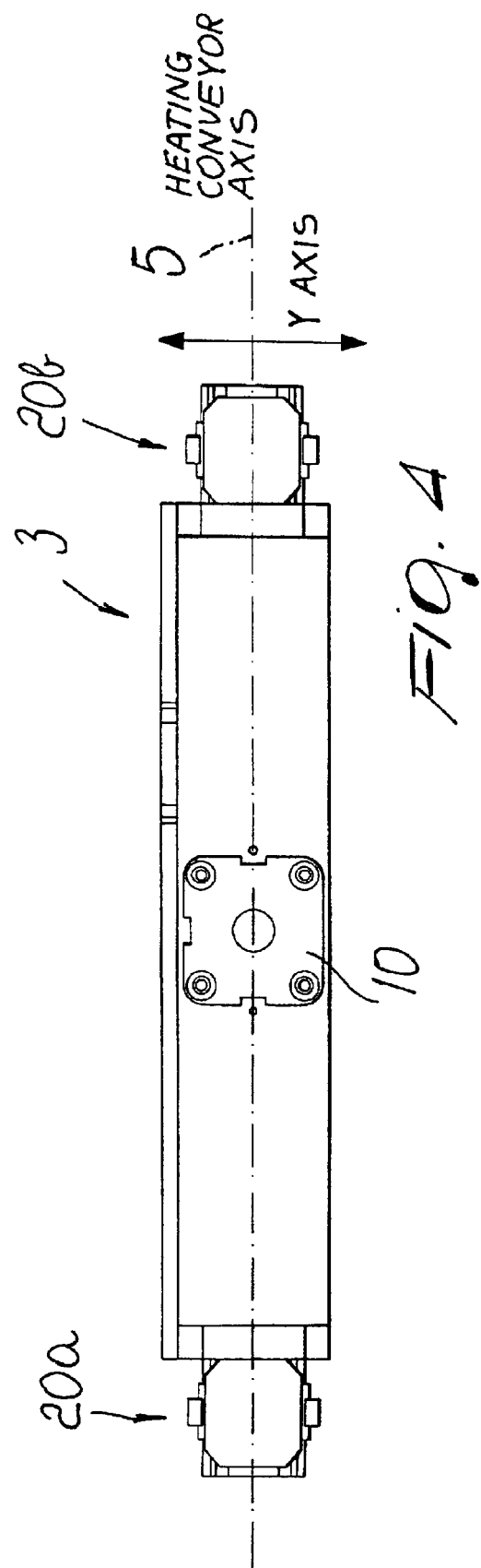

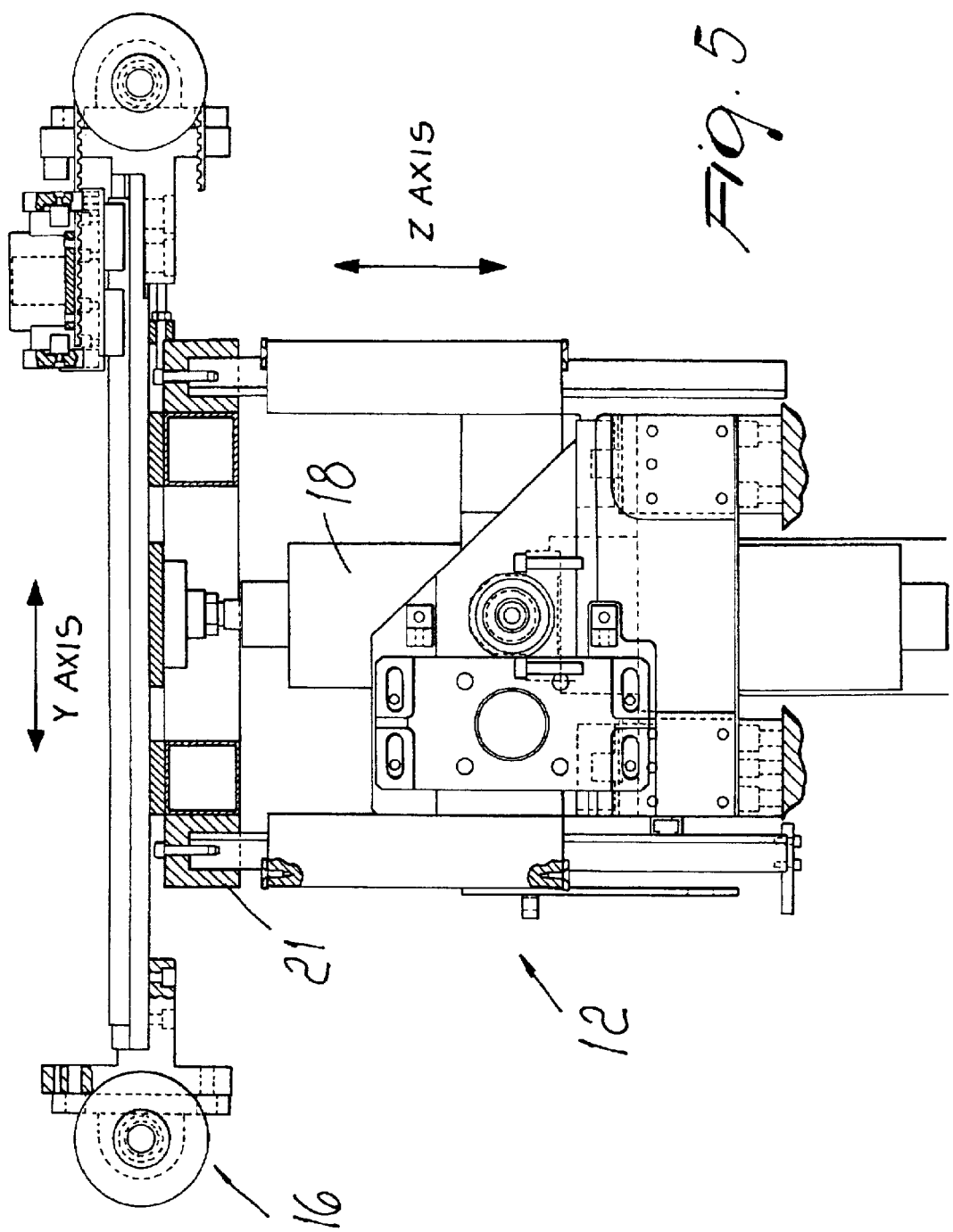

DEVICE FOR TREATING PREFORMS TO OBTAIN CONTAINERS MADE OF PLASTICS

BACKGROUND OF THE INVENTION

The present invention relates to a device for treating preforms to obtain containers made of plastics, for example for bottles for food applications.

Currently it is known to use production apparatuses constituted by one or more separate treatment stations.

In order to optimize the production process, it is necessary to provide an apparatus for the orderly and sequential movement of the preforms, which are produced beforehand and are made for example of thermoplastic resin.

Such movement system must guide the preforms, taken in succession individually or in batches, from a loading station, along at least one heating station and optionally a blow-molding station, to the unloading station.

Depending on the type of production apparatus, the preforms must move in a vertical arrangement, with their opening directed downwardly and therefore upside down, or must move assuming different positions.

In particular, depending on the type of production apparatus, it is necessary to have a suitable movement system, which must be provided with a succession of pallets, commonly known as pick-up plugs, for the temporary interconnection of the preforms.

Prior art document WO 99/62693 is currently known. It discloses an apparatus for continuously transferring orderly sequences of preforms adapted to be converted into finished containers, comprising:

- at least one closed-loop conveyor belt that constitutes guiding means for a closed-loop moving conveyor chain, which is adapted to be driven into a continuous motion
- and comprises a plurality of support and forward carrying elements suitable for carrying a respective preform,
- a station for loading said preforms,
- an unloading station, adapted to separate the preforms from said elements,
- at least one temperature conditioning station for the preforms arranged on said elements, interposed between said loading and said unloading station,
- means for moving said support and forward-carrying elements along said closed-loop belt,
- said support and forward carrying elements being provided with respective pick-up plugs to pick up, accommodate and release the respective preforms, characterized in that
- said loading and unloading stations are arranged so that the preforms are loaded onto the pick-up plugs, and released therefrom, in a vertical position with their neck portion turned upwardly,
- said support and forward carrying elements are rotated as they move between said loading station and said unloading station so that, when they move through said temperature conditioning station, the respective preforms are positioned vertically with their neck portion turned downwardly.

Moreover, FR-2,646,632 discloses devices suitable to reverse twice the orientation of the preforms, so that their neck is again directed downwardly when they are temperature-conditioned and their neck is directed upwardly for the loading and unloading steps.

The main drawback of this described known art is that these machines, usually known as "continuous" or "rotary", are structurally complicated, since it is necessary, particularly for the blow-molding station, to provide components, such as the blow-molding and cooling systems, which are usually made to perform a rotation that requires a complicated cooperation with fixed radial elements such as the molds.

Moreover, these known types of machine have high production and maintenance costs and are at the same time complicated from a structural standpoint.

Machines are also known which are termed "discontinuous" and comprise two separate heating and blow-molding units; one of their drawbacks is that discontinuous heating is of the non-uniform type, and a "view" effect is in fact noted in the heating of the preforms, which are placed in a fixed position in front of the heating lamps and are heated differently depending on whether they are at the center of the lamp or at its edges; furthermore, such lamps have a non-uniform emission curve along their length (emission is higher at the center).

This produces preforms that have mutually different thermal "histories".

Italian patent no. 1,274,324 is also known which illustrates a modular apparatus that uses a moving comb that picks up the preforms, whose neck is directed upwardly, after heating them and places them at a mold for blow-molding.

The main drawback of this known apparatus is that during the heating of the preforms their neck is directed upwardly, and this is a technical problem, since the neck is a part of the preform that should remain as cold as possible.

SUMMARY OF THE INVENTION

The aim of the present invention is to solve the above noted technical problems, eliminating the drawbacks of the cited known art, by providing a device that allows to use a discontinuous machine, achieving high productivity, and to provide optimum heating, maintaining a low temperature for the neck region of the preforms, and a blow-molding that can be achieved by way of simple structural solutions and low production and management costs.

Within this aim, an object of the invention is to provide a device that allows to manage the preforms in the heating station so that their neck is directed downwardly.

Another object is to provide a device that is structurally simple and has low manufacturing costs and times.

This aim and these and other objects that will become better apparent hereinafter are achieved by a device for treating preforms to obtain containers made of plastics, characterized in that it comprises:

- an ejector suitable to pick up and release one or more of said preforms, arranged so that the neck of said preforms is directed upwardly, from a heating conveyor and:
- a unit for transferring said one or more preforms unloaded from said heating conveyor, which is suitable to modify spacing and speed of said preforms, adapting them to spacing and speed of an adjacent and axially offset blow-molding conveyor to which said one or more preforms are transferred.

BRIEF DESCRIPTION OF THE DRAWINGS

Further characteristics and advantages of the present invention will become apparent from the following detailed description of a particular embodiment thereof, illustrated only by way of non-limitative example in the accompanying drawings, wherein:

FIG. 3 is a side view of an element that constitutes the ejector;

FIG. 4 is a top view of the element that constitutes the ejector;

FIG. 5 is a sectional view of the elements that constitute the transfer unit;

DESCRIPTION OF THE PREFERRED EMBODIMENTS

Figure 1:
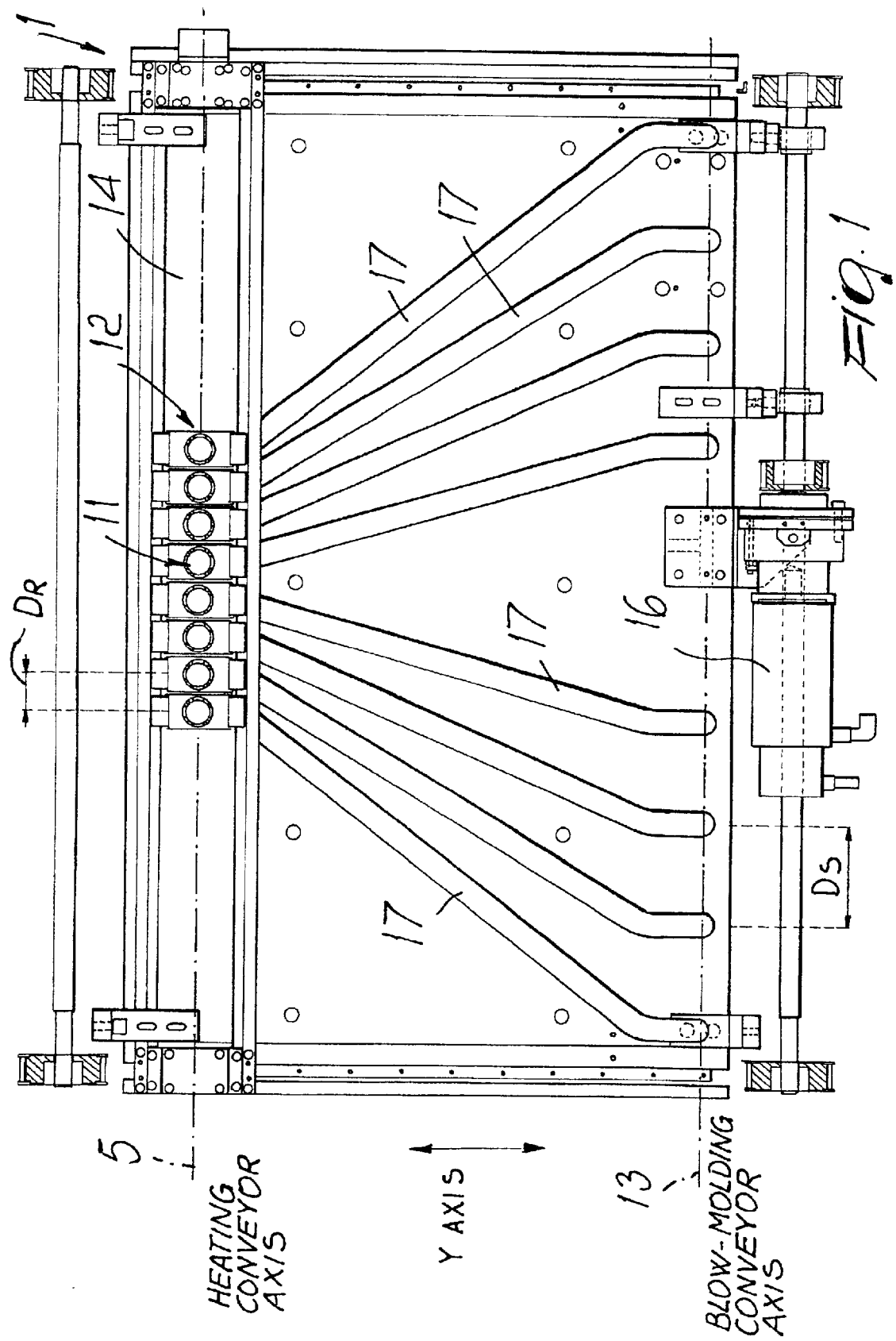
FIG. 1 is a top view of the transfer unit of the device.
Figure 2:
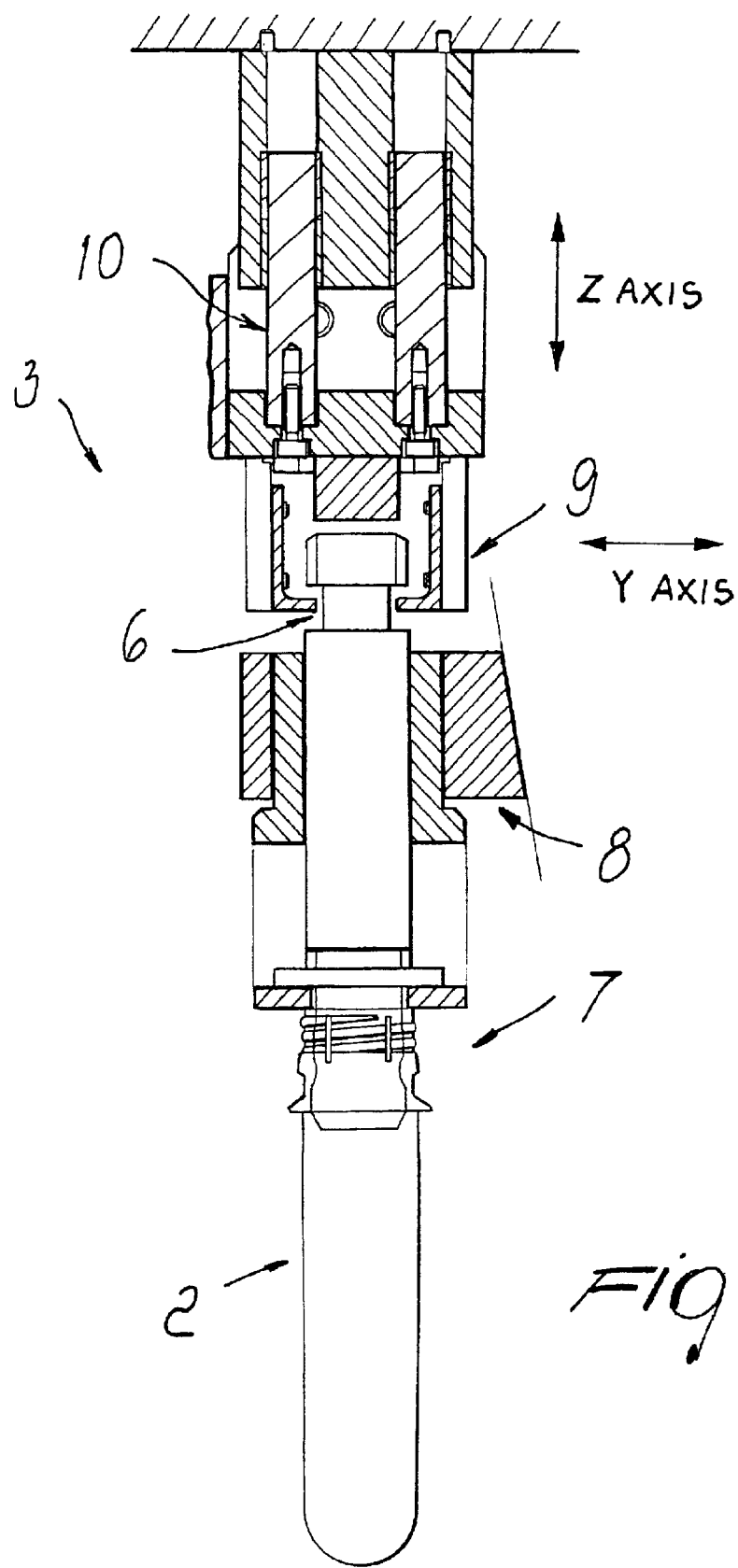
FIG. 2 is a sectional view of a component of the ejector.
Figure 6:
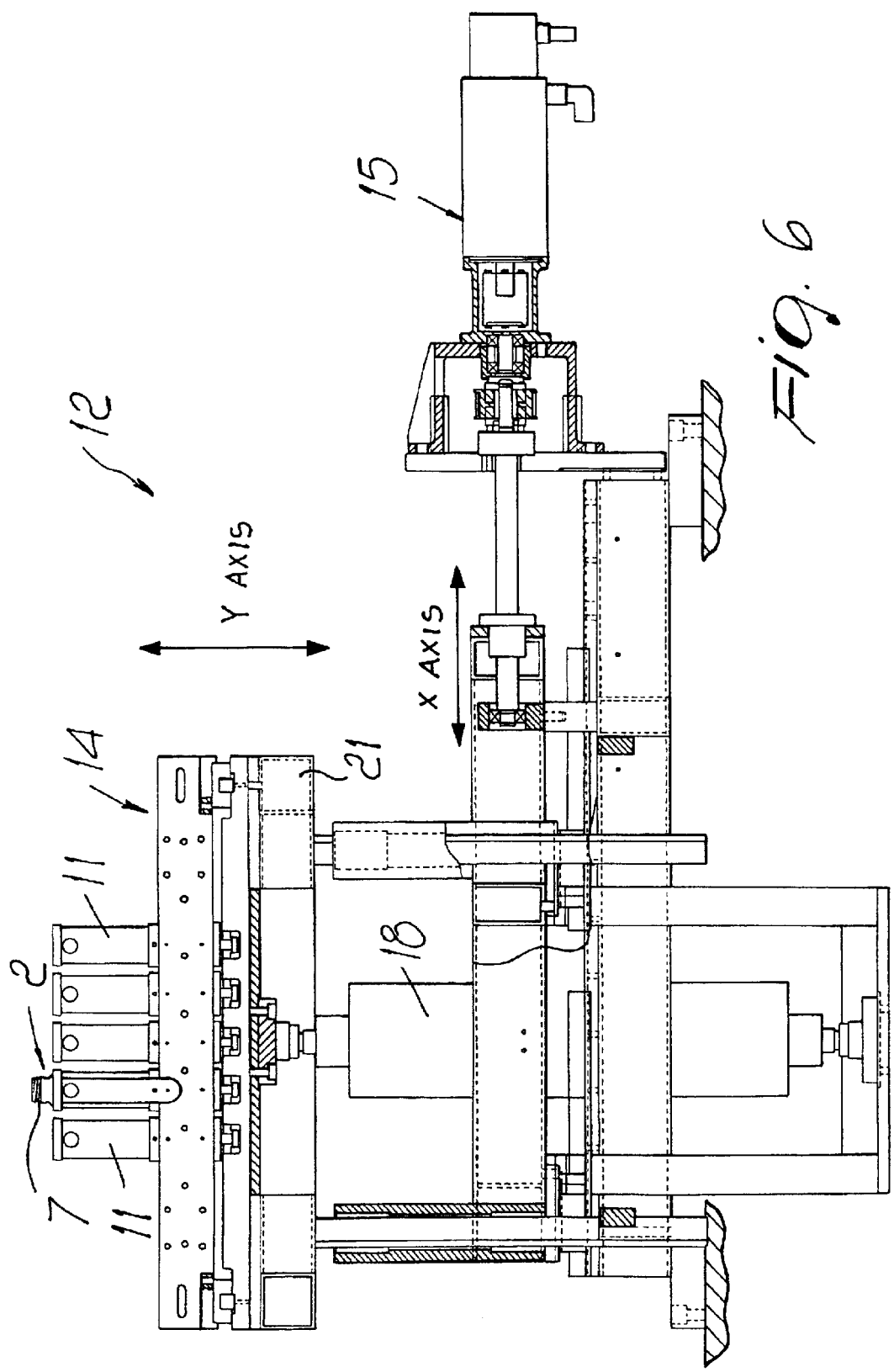
FIG. 6 is a partially sectional view of the transfer unit.

With reference to the figures, the reference numeral 1 designates a device for treating preforms 2 to obtain containers made of plastics.

The device is constituted by an ejector, generally designated by the reference numeral 3, which is associated with a heating conveyor, whose axis is designated by the reference numeral 5.

The reference sign DR designates the distance between two supports 6 for mutually adjacent preforms in the heating conveyor.

The number of the supports, as well as their series, can be any; in the particular embodiment, one of multiple series of eight supports is considered.

Each support 6 supports the preforms 2, whose neck 7 is directed upwardly, and is associated with a suitable pick-up plug 8, which is connected to the support 6 by means of an appropriately provided preform grip element.

The upward orientation of the neck 7 of each preform 2 is achieved following a rotation through approximately 180° of the corresponding pick-up plug with which the preform is associated after the heating step, so as to optimize the subsequent blow-molding step.

The ejector 3 is composed of a first actuator 10, preferably of the pneumatic type, which allows to impart an upward movement along an axis designated by the letter Z, by moving two appropriately provided jaws 9, to a chosen series of supports 6.

The upward movement of each series of supports 6 is followed by the release of the corresponding preforms 2 from said pick-up plugs 8, with the consequent fall thereof at at least one suitable underlying series of cups 11 in which each preform settles with its neck 7 directed upward.

The ejector 3 then actuates, by means of a pair of second actuators 20a and 20b, the opening movement of the jaws 9 along the axis Y, allowing the support 6 to descend by gravity.

The ejector 3 is then made to descend along the axis Z and the jaws 9 are made to close along the axis Y.

The series of cups 11 is part of a unit 12 for transferring said preforms to an adjacent and axially offset blow-molding conveyor, whose axis is designated by the reference numeral 13.

The series of cups 11 is mounted on a suitable carriage 14, which can move along an axis X; this movement is achieved by way of a suitable first motor 15 and is suitable to synchronize the carriage 14 with the overlying series of supports 6, so as to allow the preforms released by the ejector 3 to fall into the cups 11 after a first upward movement along the axis Z of the carriage 14.

Once the preforms have been released into the cups 11, the carriage 14 is made to move along an axis, designated by the reference letter Y and perpendicular to the preceding axes X and Z, by virtue of a suitable second motor 16.

The movement can be obtained by means of a belt or chain suitably guided on an appropriately provided pulley or with other known devices; the same applies to the preceding movements along the X and Z axes.

The movement along the Y axis varies the distance between the two mutually adjacent cups 11, which are made to slide at suitable guides 17 which are substantially radial and are suitable to position, at the end of the path, the series of cups in one or more separate series, for example of four cups each, spaced by a selected extent which is designated for example by the symbol $D_S$.

At this point the carriage 14 is made to rise for the second time, again along the axis Z, since there is a suitable third actuator 18, advantageously a pneumatic cylinder or other device suitable to vary the height of said carriage.

The carriage in fact ends its movement along the axis Y at a region below a blow-molding conveyor, whose axis is designated by the reference numeral 13 and is therefore adjacent and axially offset with respect to the heating conveyor, whose axis, designated by the reference numeral 15, is parallel to the axis 13.

During the entire cycle, the neck 7 of the preforms 2 is directed upward.

Figure 7:
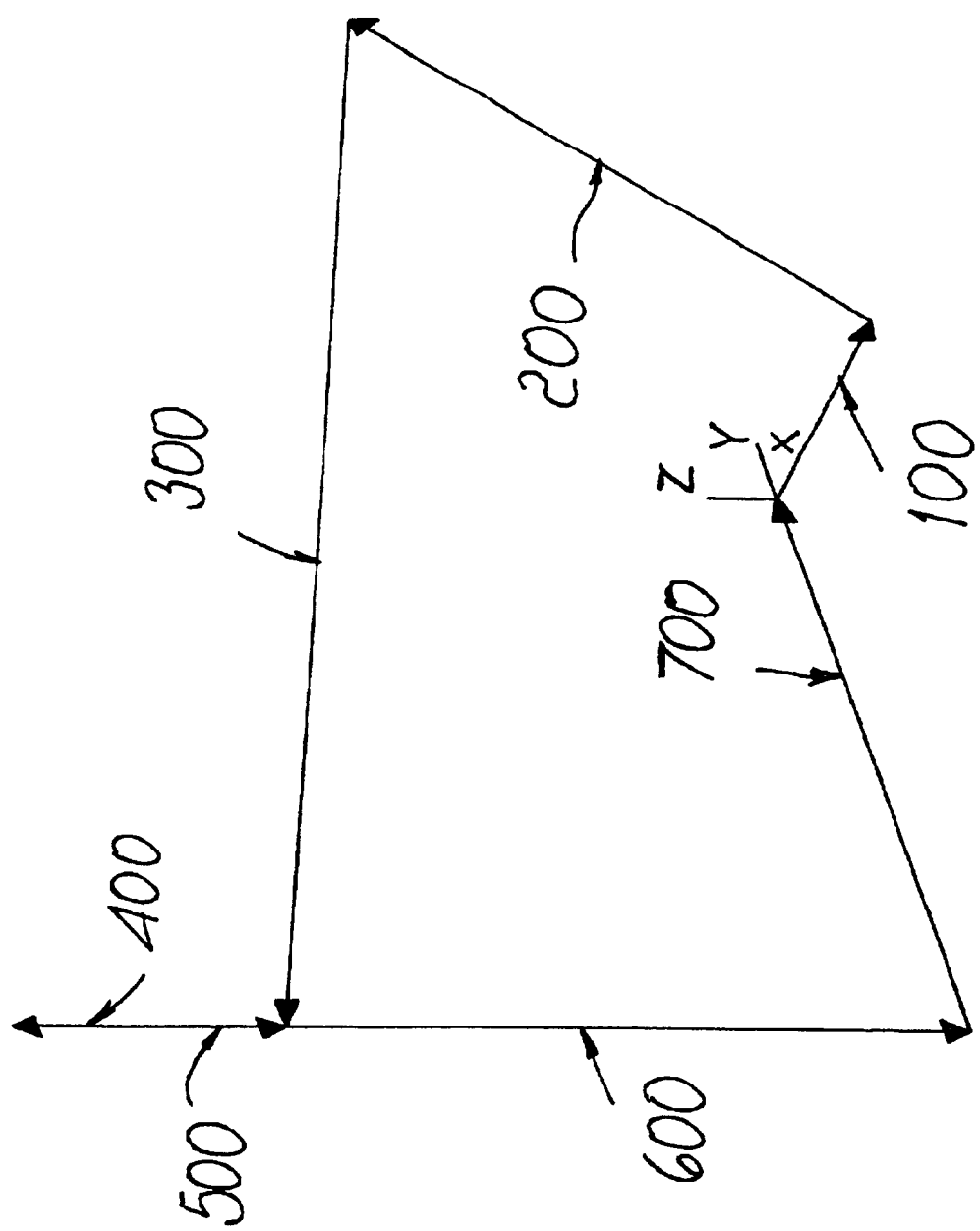
FIG. 7 is a schematic view of the movements to which an imaginary point located at the top of a cup is subjected.

The cycle as shown schematically in FIG. 7 is now briefly described.

Initially, a first step is considered which is designated by the reference numeral 100 and in which the transfer unit 12 reaches the speed of the heating conveyor.

This is followed by a second step in which the carriage 14 and the support 21 associated therewith perform a first upward stroke, in the direction of the axis Z, moving simultaneously also along the axis X of the transfer unit: in this manner, the cups 11 are arranged below the overlying series of pick-up plugs, receiving from them the preforms that they release by means of the ejector 3.

This movement is designated by the reference numeral 200 in the diagram of FIG. 7.

This is followed by a third step, designated by the reference numeral 300, in which the transfer unit 12 performs a return translational motion along the axis X which returns it to the condition prior to the movement of step 100, and the carriage 14 alone performs a translational motion along the axis Y, changing the distance between the cups and therefore between the preforms.

This is followed by a fourth step, designated by the reference numeral 400, in which the carriage 14 and the support 21 are moved upward along the axis Z, entailing in practice the insertion of the preforms in the blow-molding conveyor.

This is followed by a fifth step, designated by the reference numeral 500, which is followed by a sixth step, designated by the reference numeral 600, in which a first descent and a second descent along the axis Z occur, returning the carriage 14 and the support 21 to the position assumed initially thereby along such axis prior to the step designated by the reference numeral 100.

This is followed by a seventh and last step, designated by the reference numeral 700 in the diagram, in which the carriage 14 alone is moved along the axis Y, thus returning to the initial condition that preceded the step designated by the reference numeral 100; the cycle then restarts.

The cycle must of course be completed before another series of supports arrives at the ejector 3.

It has thus been found that the invention has achieved the intended aim and objects, a device having been provided which allows to constitute an interface between a continuous motion imparted to preforms at a heating conveyor and a separate and adjacent blow-molding conveyor after changing the spacing of suitable cups that contain the preforms and then return to pick up the preforms in the heating conveyor before a new series arrives for release.

By means of this device it is therefore possible to produce a machine for obtaining containers made of plastics that has a heating process that is comparable to the process that can be obtained with a continuous or rotary machine, and has the low cost and simplicity of use and maintenance of a machine that has a discontinuous blow-molding process.

Moreover, the device thus provided allows to use, for the heating conveyor, a reduced spacing and therefore a reduced distance between two adjacent preforms, so as to achieve maximum heating efficiency and at the same time have, in the blow-molding conveyor, as required, a spacing that is greater than the size of the container to be formed.

The invention is of course susceptible of numerous modifications and variations, all of which are within the scope of the appended claims.

The materials used, as well as the dimensions of the individual components of the invention, may of course be any according to specific requirements.

The disclosures in San Marinese Patent Application No. SM-A200100008 from which this application claims priority are incorporated herein by reference.

What is claimed is:

1. A device for treating preforms to obtain containers made of plastics, comprising:

an ejector suitable to pick up and release one or more of said preforms, arranged so that the neck of said preforms is directed upwardly, from a heating conveyor and a unit for transferring said one or more preforms unloaded from said heating conveyor, which is suitable to modify spacing and speed of said preforms, adapting them to spacing and speed of an adjacent and axially offset blow-molding conveyor to which said one or more preforms are transferred, wherein said ejector is composed of a first actuator, which allows to impart an upward motion by way of the movement of two jaws, to a selected series of supports, said upward movement of each series of supports being followed by a release of the corresponding preforms from said pick-up plugs, with consequent fall with the neck of the preforms facing upward at at least one present series of underlying series of cups, and wherein said series of cups is mounted on a carriage which can be moved along an axis X, said movement being obtained by means of a suitable first motor and being suitable to synchronize said carriage with said overlying series of supports so as to allow said preforms released by said ejector to fall into said cups after a first upward motion along an axis Z of said carriage.

2. The device according to claim 1, wherein said ejector is associated, in an upward region, with a heating conveyor which has a distance $D_R$ between two adjacent supports for said preforms, each support supporting said preforms, whose neck is directed upward and is associated with a suitable pick-up plug interconnected to said support by means of a pair of movable jaws, the positioning of said neck being obtained following a rotation through approximately 180° of the corresponding pick-up plug with which said preform is associated after the heating step.

3. The device according to claim 1, wherein said ejector subsequently actuates, by means of a pair of second actuators, an opening movement of said jaws, allowing said support to descend by gravity.

4. The device according to claim 1, wherein said series of cups is part of a unit for transferring said preforms to an adjacent and axially offset blow-molding conveyor.

5. The device according to claim 1, wherein said carnage is actuated along an axis perpendicular to said axis X and Z by a second motor.

6. The device according to claim 5, wherein the movement along the Y axis varies the distance between two of said mutually adjacent cups, which are made to slide at suitable guides which are arranged substantially radially and are suitable to position, at the end of the path, said series of cups in one or more separate series of a chosen number of cups spaced by a chosen distance $D_S$.

7. The device according to claim 5, wherein said carriage is made to perform a second upward movement along the axis Z by means of a third motor adapted to vary the height of said carriage.

8. The device according to claim 7, wherein said carriage ends its movement along the axis Y at a region located below a blow-molding conveyor whose axis is adjacent and offset with respect to said heating conveyor, whose axis is in turn parallel to the preceding one.

9. The device according to claim 1, wherein the neck of said preforms is directed upwardly throughout the cycle.

10. The method for treating preforms to obtain containers made of plastics, comprising a first step, in which a transfer unit reaches the speed of a heating conveyor, followed by a second step, in which a carriage and a support associated therewith are made to perform a first upward stroke along an axis Z, with a simultaneous movement of a transfer unit also along an axis X so as to position cups below an overlying series of pick-up plugs, receiving from them said preforms, which they disengage by means of an ejector.

11. The method according to claim 10, further comprising a third step in which said transfer unit performs a return translational motion along said axis X, returning it to the condition prior to the movement performed in said first step, and said carriage alone performs a translational motion along said axis Y which varies the distance between cups and between said preforms.

12. The method according to claim 11, further comprising a fourth step, in which said carriage and said support with which it is associated are moved upward along said axis Z, entailing the insertion of said preforms in a blow-molding conveyor.

13. The method according to claim 12, further comprising a fifth step followed by a sixth step during which a first descent and a second descent occur along said axis Z, returning said carriage and said support with which it is associated to the position assumed initially thereby along said axis prior to said first step.

14. The method according to claim 13, further comprising a seventh step in which said carriage alone is moved along said axis Y and is repositioned in the initial condition that preceded said first step.

* * * * *